(12) United States Patent
Gillet et al.

(10) Patent No.: US 7,978,728 B2
(45) Date of Patent: Jul. 12, 2011

(54) NETWORK CLUSTERING FOR IMPROVING CONNECTION MANAGEMENT AND RE-ROUTING CAPABILITIES

(75) Inventors: Michel Gillet, Helsinki (FI); Sergey Balandin, Helsinki (FI)

(73) Assignee: Nokia Corporation, Espoo (FI)

( * ) Notice: Subject to any disclaimer, the term of this patent is extended or adjusted under 35 U.S.C. 154(b) by 323 days.

(21) Appl. No.: 12/078,068

(22) Filed: Mar. 26, 2008

(65) Prior Publication Data
US 2008/0247397 A1   Oct. 9, 2008

Related U.S. Application Data

(60) Provisional application No. 60/907,487, filed on Apr. 4, 2007.

(51) Int. Cl.
*H04J 3/16* (2006.01)

(52) U.S. Cl. ........................................................ 370/466

(58) Field of Classification Search .................. 370/312, 370/349, 389, 392, 465–466
See application file for complete search history.

(56) References Cited

U.S. PATENT DOCUMENTS

| 5,430,727 A | 7/1995 | Callon |
| 6,094,525 A * | 7/2000 | Perlman et al. ............... 709/245 |

FOREIGN PATENT DOCUMENTS

| WO | WO 97/02689 | 1/1997 |
| WO | WO 02/45375 A2 | 6/2002 |
| WO | WO 2005/018171 | 2/2005 |

OTHER PUBLICATIONS

International Search Report, PCT/EP2008/053535 dated Feb. 6, 2009.

* cited by examiner

*Primary Examiner* — Frank Duong
(74) *Attorney, Agent, or Firm* — Squire, Sanders & Dempsey (US) LLP

(57) ABSTRACT

Embodiments of the present invention relate to re-routing data packets in a communication network according to at least a first version and a second version of a protocol.

16 Claims, 13 Drawing Sheets

Node    Router    Cluster

Cluster Manager Node    Cluster Router    Cluster Manager Router

Fig.1
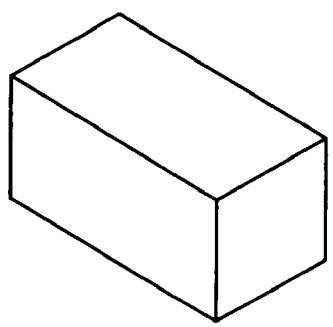
Node
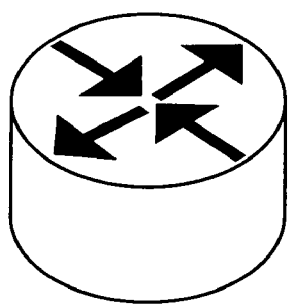
Router
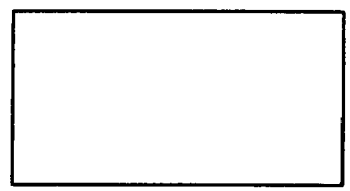
Cluster
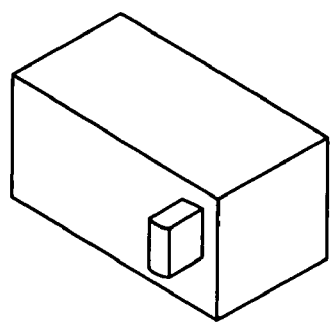
Cluster
Manager Node
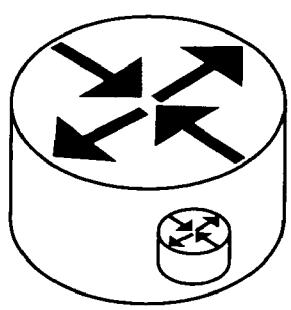
Cluster
Router
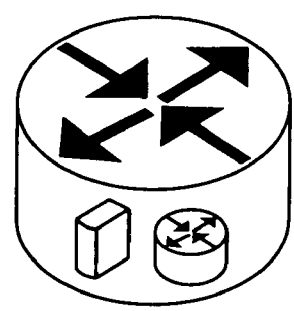
Cluster
Manager Router

Fig.15

| L3s=0 | Destination DeviceID | Source DeviceID | Ext=0 |

| L3s=0 | Destination DeviceID | Source DeviceID | Ext=1 |
| Ext Header ID | ExtH "Size"(=0h) | Parameter | Ver=0 | Ext=0 |

| L3s=0 | Destination DeviceID | Source DeviceID | Ext=1 |
| Ext Header ID | ExtH "Size"(=1h) | Parameter | Ver=0 | Ext=1 |
| Parameter1 | | | | Ext=0 |

| L3s=0 | Destination DeviceID | Source DeviceID | Ext=1 |
| Ext Header ID | ExtH "Size"(=2h) | Parameter0 | Ver=0 | Ext=1 |
| Parameter1 | | | | Ext=1 |
| Parameter0 | | | Rsv=0 | Ext=1 |
| Parameter1 | | | | Ext=1 |
| Parameter2 | | | | Ext=0 |

Legend:
- Defined in UniPro
- Not defined yet in UniPro / Extension

Fig.16

| Ext Header ID=0h | ExtH "Size"(=0h) | RR=0 | Copy | Rsv | Ver/Rsv | Ext |

| Ext Header ID=0h | ExtH "Size"(=1h) | RR=1 | Copy | Rsv | Ver/Rsv | Ext |
| Rsv | Original Destination DeviceID | | | Original Source DeviceID | | |

- Defined in UniPro
- Not defined yet in UniPro
- Extension

NETWORK CLUSTERING FOR IMPROVING CONNECTION MANAGEMENT AND RE-ROUTING CAPABILITIES

RELATED APPLICATIONS

The present application claims priority under 35 U.S.C. §119(e) to U.S. Provisional Application No. 60/907,487, filed on Apr. 4, 2007.

FIELD OF THE INVENTION

The present invention relates to network clustering for improving connection management and re-routing capabilities.

The main question in creating a connection management protocol is whether it should be centralized or distributed. So far the conclusion has been that both the centralized and distributed approach are needed, creating the complex issue of interoperability between the two different approaches.

The drawback of a centralized approach is the difficulty in the reuse of existing design, since the centralized partner changes from system to system, making it virtually impossible to verify partitions of a system designed independently. So by essence, the centralized approach blocks the design strategy of dividing a complex system in smaller parts which can be verified independently of each other.

The drawback of a distributed approach is inherent to the complexity of managing shared resources in a distributed way (increased complexity of the end devices, signalling overhead, non-optimal use of resources, etc.).

SUMMARY

Certain embodiments of the present application provide methods and respective devices for re-routing data packets in a communication network according to at least a first version and a second version of a protocol.

In particular, certain embodiments of the present application are applicable to the MIPI/UniPRO (Mobile Industry Processor Interface alliance/Unified Protocol) standardization work that is targeted to creation of the protocol stack for the new low power, high-speed serial link bus designed to be a new kind of generic and modular bus that addresses specific requirements of the mobile terminals and multimedia devices, but is not limited to this. The present invention proposes a new approach of building MIPI/UniPRO networks out of components delivered by different vendors. It defines an alternative, more efficient way of organizing connection management and routing in MIPI/UniPRO networks divided to the logically separated clusters. Deployment of the proposed solution allows to overcome the components compatibility problem, reduces network management overhead and improves network scalability.

Certain embodiments of the present application provide flexibility to the device integrators in selecting component vendors (remove currently existing dependency) and makes more fair competition between the vendors. The proposed solution is compatible with the current UniPRO standard proposal, but is not limited thereto and can also be used in many other networks or terminal architectures.

Certain embodiments of the present application relate to a method, that includes intercepting a data packet to be routed in a communication network according to at least a first version and a second version of a protocol; recognizing whether the data packet is to be routed according to the first version or the second version of the protocol; when the data packet is to be routed according to the second version of the protocol, evaluating whether the data packet is marked as having been intercepted; and when the data packet is not marked as having been already intercepted, applying predetermined rules to the data packet to obtain a processed data packet and forwarding the processed data packet.

Certain embodiments of the present application relate to an apparatus that includes an interceptor configured to intercept a data packet to be routed in a communication network according to at least a first version and a second version of a protocol; a recognizer configured to recognize whether the data packet is to be routed according to the first version or the second version of the protocol and to evaluate whether a data packet to be routed according to the second version of the protocol is marked as having been intercepted; an applier configured to apply predetermined rules to the data packet thereby obtaining a processed data packet; and a transmitter configured to forward the processed data packet.

Certain embodiments of the present application relate to A method that includes analyzing, at a managing device, whether a received data packet is to be routed according to a first version or a second version of a protocol; and when the data packet is a data packet to be routed according to the second version of a protocol and a destination address in an extended header of the data packet to be routed according to the second version of the protocol is not the address of the managing device itself, replacing a destination address in a header by an address of a destination contained in the extended header, and forwarding the data packet.

Certain embodiments of the present application relate to an apparatus that includes an analyzer configured to analyze whether a data packet is to be routed according to a first version or a second version of a protocol; a determiner configured to determine whether an address of a destination in a header and an address of an original destination contained in an extended header are the same; a replacer configured to replace the address of the destination in the header by the address of the original destination contained in the extended header; and a forwarder configured to forward the data packet.

Certain embodiments of the present application relate to a method that includes creating an extended header of a data packet to be routed in a communication network. In particular, the creating includes adding an extension header identification field, adding an extension header size field, adding an original source identification field and an original destination identification field, and adding a record route field indicating whether the original source identification field and the original destination identification field are present.

Certain embodiments of the present application relate to an apparatus that includes a creator configured to create an extended header of a data packet to be routed in a communication network. The creator is further configured to add an extension header identification field, add an extension header size field, add an original source identification field and an original destination identification field, and add a record route field indicating whether the original source identification field and the original destination identification field are present.

Various embodiments of the present application relate to an apparatus that include intercepting means for intercepting a data packet to be routed in a communication network according to at least a first version and a second version of a protocol; recognizing means for recognizing whether the data packet is to be routed according to the first version or the second version of the protocol and for evaluating whether a data packet to be routed according to the second version of the protocol is marked as having been intercepted; an application means for applying predetermined rules to the data packet thereby obtaining a processed data packet; and forwarding means for forwarding the processed data packet.

Certain embodiments of the present application relate to an apparatus that includes analyzing means for analyzing whether a data packet is to be routed according to a first version or a second version of a protocol, replacing means for replacing a destination address in a header by an address of a destination contained in an extended header, and forwarding means for forwarding the data packet.

Other embodiments of the present application relate to an apparatus that includes creating means for creating an extended header of a data packet to be routed in a communication network; and adding means for adding an extension header identification field, adding an extension header size field, adding an original source identification field and an original destination identification field, and adding a record route field indicating whether the original source identification field and the original destination identification field are present.

Certain embodiments of the present application relate to a computer readable medium having computer executable components including intercepting a data packet to be routed in a communication network according to at least a first version and a second version of a protocol; recognizing whether the data packet is to be routed according to the first version or the second version of the protocol; when the data packet is to be routed according to the second version of the protocol, evaluating whether the data packet is marked as having been intercepted; and when the data packet is not marked as having been already intercepted, applying predetermined rules to the data packet to obtain a processed data packet and forwarding the processed data packet.

Certain embodiments of the present application relate to a computer readable medium having computer executable components for analyzing, at a managing device, whether a received data packet is to be routed according to a first version or a second version of a protocol; and when the data packet is a data packet to be routed according to the second version of a protocol and a destination address in an extended header of the data packet to be routed according to the second version of the protocol is not the address of the managing device itself, replacing a destination address in a header by an address of a destination contained in the extended header, and forwarding the data packet.

Certain further embodiments of the present application relate to a computer readable medium having computer executable components including creating an extended header of a data packet to be routed in a communication network. The creating includes adding an extension header identification field, adding an extension header size field, adding an original source identification field and an original destination identification field, and adding a record route field indicating whether the original source identification field and the original destination identification field are present.

For the purpose of the various embodiments of the present application to be described herein below, it should be noted that:

- a node may for example be any kind of communication device, such as wireless or wired devices, e.g. personal computers, mobile phones or the like, irrespective of a specific standard to which these conform;
- method steps likely to be implemented as (low level) software code portions and being run using a processor at one of the server/terminal entities, are software code independent and can be specified using any known or future developed programming language as long as the functionality defined by the method steps is preserved;
- generally, any method step is suitable to be implemented as software or by hardware without changing the idea of the present invention in terms of the functionality implemented;
- method steps and/or devices likely to be implemented as hardware components at one of the entities (node, cluster router, managing node, etc.) are hardware independent and can be implemented using any known or future developed hardware technology or any hybrids of these, such as MOS (Metal Oxide Semiconductor), CMOS (Complementary MOS), BiCMOS (Bipolar CMOS), ECL (Emitter Coupled Logic), TTL (Transistor Transistor Logic), etc., using for example ASIC (Application Specific Integrated Circuit) components or DSP (Digital Signal Processor) components, as an example;
- devices can be implemented as individual devices, but this does not exclude that they are implemented in a distributed fashion throughout the system, as long as the functionality of the device/system is preserved;
- respective elements, e.g. recognizing unit, intercepting unit etc. according to present embodiments can be implemented by any known means, either in hardware (DSP, microprocessor, microcontroller, ASIC, FPGA, etc) and/or software, respectively, as long as it is adapted to perform the described functions of the respective parts.

BRIEF DESCRIPTION OF THE DRAWINGS

The various embodiments of the present application is described herein below with reference to the accompanying drawings, wherein:

FIG. 1 is an overview showing the definition of the main network elements according to an embodiment of the present invention;

FIG. 15 shows UniPRO data packet format including extension bit and a proposed extension format according to an embodiment of the present invention; and FIG. 16 shows a re-routing extension format of the data packet according to an embodiment of the present invention.

DETAILED DESCRIPTION OF EMBODIMENTS OF THE INVENTION

Certain embodiments of the present application will be described herein below with reference to the accompanying drawings.

A communication network, to which certain embodiments of the present invention are applicable may comprise the following elements, as shown in FIG. 1. Basically, a communication network is made up of at least one cluster. A cluster may comprise several nodes (end devices, e.g. a destination and a source). Further, a cluster may comprise one or more conventional switch(es)/router(s), one or more cluster switch(es)/router(s), which behave like classical switch(es)/router(s) and in addition implement the re-routing mechanism according to the present invention, a cluster manager, which is a centralized entity managing the cluster and a cluster manager switch/router, which is a cluster switch/router, but has also the cluster management ability.

Figure 2:
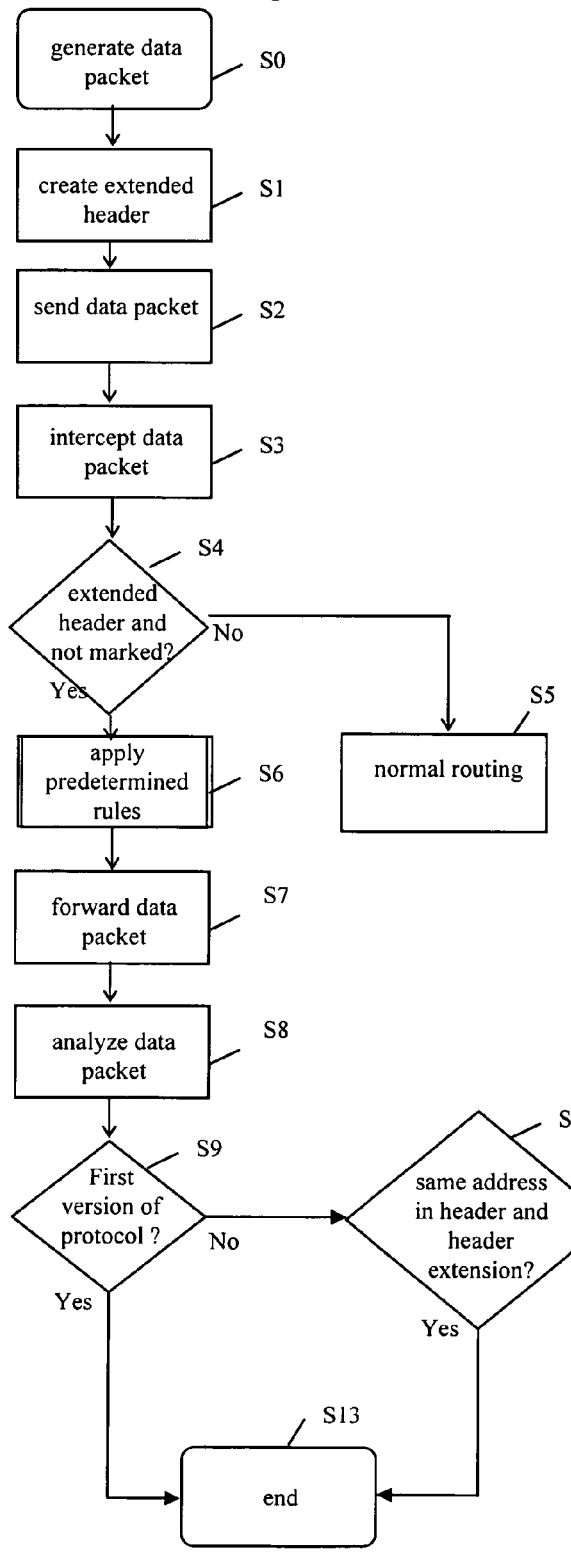
FIG. 2 is a flowchart illustrating the re-routing process according to an embodiment of the present invention.

FIG. 2 is a flowchart of the re-routing process according to an embodiment of the present invention.

According to FIG. 2, first at step S0, the source generates a data packet. If the data packet is to be sent according to a second version of the protocol (e.g. a centralized version of the protocol), the source will add an extended header (containing routing information) to the data packet at step S1 and send the data packet in step S2. At step S3, a cluster router implementing the re-routing mechanism intercepts the data packet and recognizes at step S4 whether the data packet comprises an extended header. If the cluster router does not recognize an extended header, the data packet is routed through the network in a conventional manner at step S5. Otherwise, if the cluster router recognizes at step S4 that an extended header is present and that the data packet is not marked as having been intercepted, it applies predetermined rules to the data packet at step S6, which will now be described in more detail with reference to FIG. 3.

Figure 3:
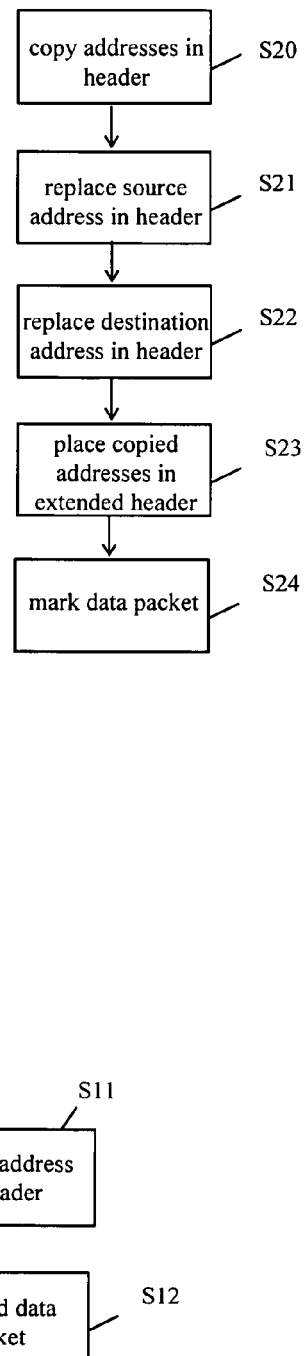
FIG. 3 is a flowchart illustrating the processing during the application of predetermined rules according to an embodiment of the present invention.

According to FIG. 3, the applying of predetermined rules comprises copying the addresses of the source and the destination at step S20. Further, at step S21, the cluster router replaces the address of the source by the address of itself and at step S22 replaces the address of the destination in the header by the address of a cluster manager node. Then, at step S23, it places the copied address of the original destination and source in the extended header of the data packet and marks the data packet as being intercepted at step S24.

Referring back to FIG. 2, after applying the predetermined rules, at step S7 the cluster router forwards the processed data packet to the cluster manager node, which after receiving the data packet analyzes the data packet at step S8. If the cluster manager node determines at step S9 that the data packet is to be routed according to a first version of the protocol (e.g. a distributed version of the protocol), the routing of the data packet ends at step S13 since the data packet has reached its destination.

Otherwise, if the cluster manager node determines at step S9 that the data packet is to be routed according to a second version of the protocol (e.g. a centralized version of the protocol), the cluster router further determines at step S10 whether the address of the destination in the header and the address contained in the extended header are the same. If the address is determined to be the same, the routing of the data packet ends at step S13 since the data packet has reached its destination. When the address contained in the header and the extended header do not match, the cluster manager replaces the address of the destination in the header by the address contained in the extended header and forwards the data packet at step S12. Thus, the data packet is routed to its original destination.

Figure 4:
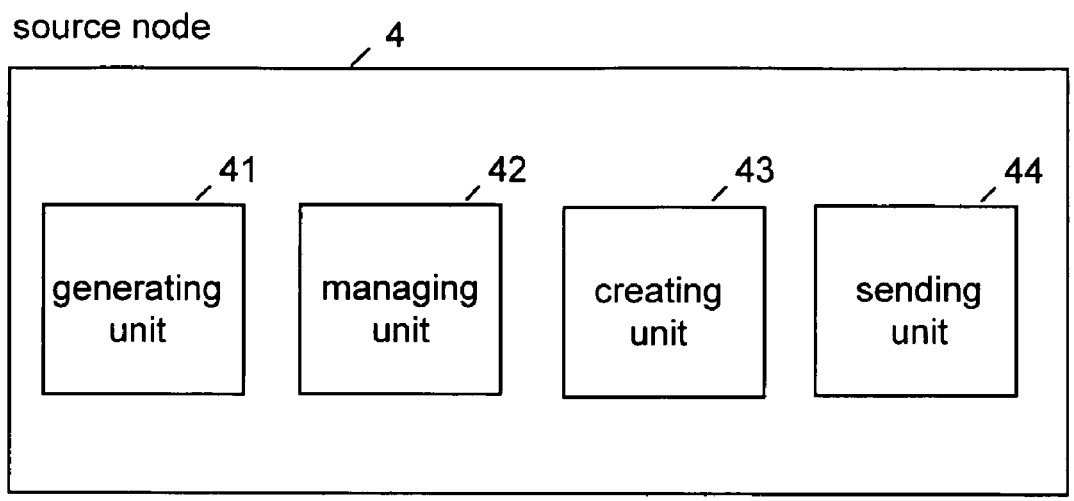
FIG. 4 is a block diagram of a source according to an embodiment of the present invention.

FIG. 4 is a block diagram of a source according to an embodiment of the present invention.

As shown in FIG. 4, a source according to embodiments of the present invention comprises a generating unit (generator) 41 that generates data packets to be routed through the network. Further, the source has a managing unit (manager) 42 that recognizes whether the cluster operates in a distributed or centralized way and the source has to act accordingly. This decision can be made at the design time or boot time of the source, or could even be made dynamically for certain protocols. The source additionally comprises a creating unit (creator) 43 to create an extended header and to add the re-routing extension header to all data packets (for the given protocol) generated by the generating unit 41. The generated data packets are then send by a sending unit (sender) 44.

Figure 5:
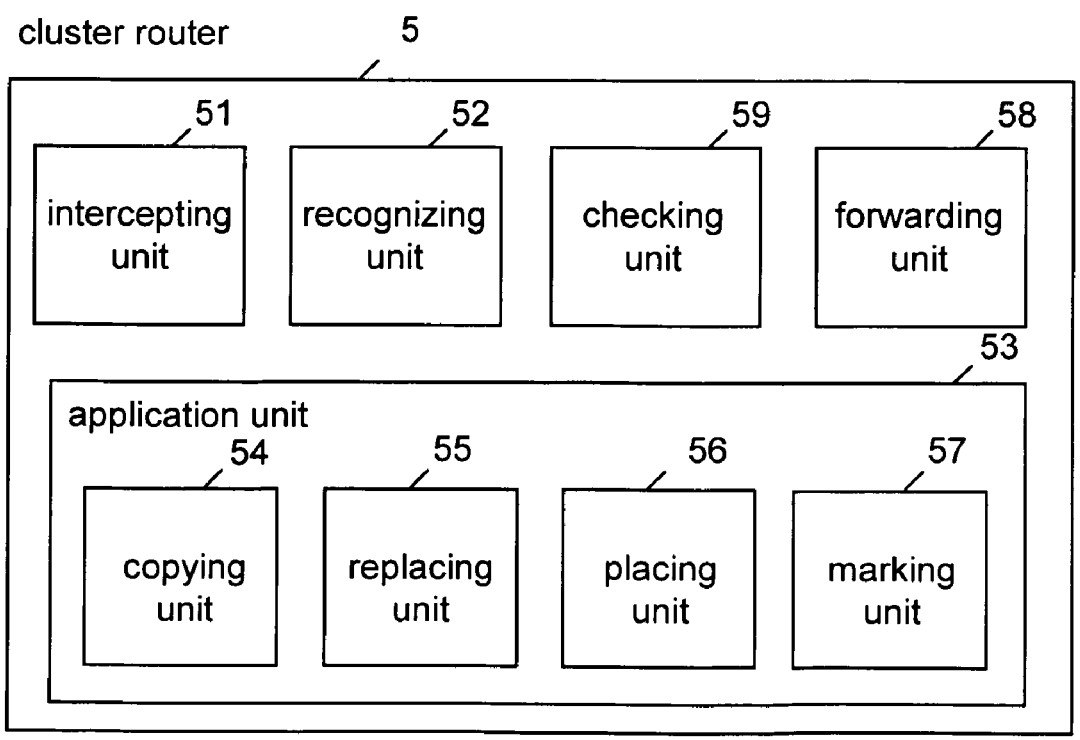
FIG. 5 is a block diagram of a device according to an embodiment of the present invention.

FIG. 5 is a block diagram of a cluster router according to an embodiment of the present invention.

As shown in FIG. 5, a cluster router according to embodiments of the present invention comprises an intercepting unit (interceptor) 51 for intercepting data packets sent by a source. Further, the cluster router has a recognizing unit (recognizer) 52 to recognize whether the intercepted data packet is to be routed according to the first or the second version of the protocol. Namely, the recognizing unit 52 determines whether the data packet has an extended header and whether the data packet is marked as having been intercepted. Furthermore, the cluster router has an application unit (applier) 53 to apply predetermined rules to a data packet that is to be routed according to the second version of the protocol. The application unit consists of a copying unit (copier) 54, a replacing unit (replacer) 55, a placing unit (placer) 56 and a marking unit (marker) 57. The copying unit 54 copies the addresses of the original source and destination contained in the header of the data packet. The replacing unit 55 replaces the address of the original source by its own address and replaces the address of the original destination by the address of a cluster manager node. Then, the placing unit 56 places the addresses of the original source and destination in the extended header of the data packet and the marking unit marks the data packet as being already intercepted by means of, for example, a flag contained in the extended header. After the application of the predetermined rules, the processed data packet is forwarded to the cluster manager node. As an option, the cluster router may further comprise a checking unit (checker) 59, the function of which will be described later.

Figure 6:
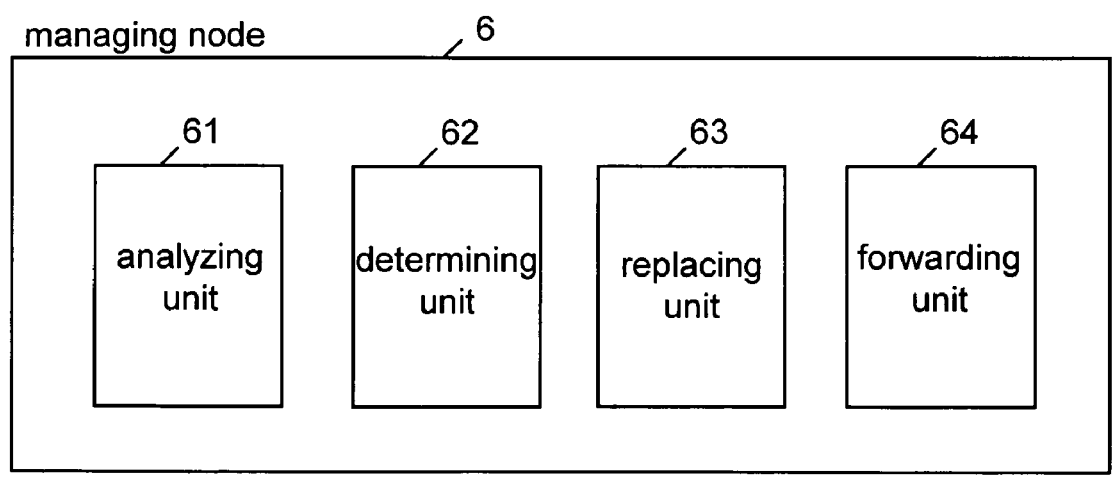
FIG. 6 is a block diagram of a managing node according to an embodiment of the present invention.

FIG. 6 is a block diagram of a cluster manager node according to an embodiment of the present invention.

According to FIG. 6, a cluster manager node according to embodiments of the present invention has an analyzing unit (analyzer) 61 to analyze whether a received data packet is to be routed according to the first or second version of the protocol. Further, the cluster manager node has a determining unit (determiner) 62 to determine whether the address of a destination in the header and the address of the original destination in the extended header are the same. Furthermore, the cluster manager node comprises a replacing unit (replacer) 63 to replace the address in the header by the address of the original destination contained in the extended header, when the data packet is to be routed according to the second version of the protocol and the address in the header and the extended header do not match. Then, the cluster manager node forwards the data packet by means of a forwarding unit (forwarder) 64.

In the foregoing description of the source, the cluster router and the cluster manager node, only the units that are relevant for understanding the principles of the invention have been described using functional blocks. Of course it is obvious that the source, the cluster router and the cluster manager node may comprise further units that are necessary for their operation. However, a description of these units is omitted in this specification. The arrangement of the functional blocks of the network devices is not construed to limit the invention, and the functions may be performed by one block or further split into sub-blocks.

In the foregoing, the present invention has been described in rather general terms. For a better understanding, in the following, a detailed example of the aspects involved in the present invention will be described.

In the detailed example, the first version of the protocol corresponds to a distributed version of the protocol and the second version of the protocol corresponds to a centralized version of the protocol. According to this example, there is proposed a clustered connection management which is a superset of both centralized and distributed approaches. This basically means that it uses the advantages of both in a completely transparent manner for the user of this protocol.

Here, as a cluster, we define a set of network node(s) which are associated by certain relations. Here, this associative relation defines a cluster to be the atomic reusable element verifiable independently of the rest of the network.

According the example of the present invention, there are two types of connections: connections within the cluster and connections going out of the cluster. All connections within the cluster are managed by the cluster itself, while the others are managed by an entity external to the cluster.

Nonetheless, a node of any cluster does not need to know if the remote destination for a connection is within its own cluster or not, this is made completely transparent.

One of the differences between the centralized and distributed approach is how the packet routing is organized. In a centralized fashion all routing decisions are initiated by the central manager (cluster manager node), which results in significant management overhead and limits scalability. The present invention proposes to localize a routing solution in a network cluster layer 3 functionality, making these features available to all protocols supported in the cluster, so not only to connection management. This can be achieved by defining a type of the routing mechanism already in place and by marking that type of routing to be used in the L3 header of the data packets. The goal is basically to provide an easy mechanism for a router/switch to re-route a data packet based on information in the L3 header.

Figure 7:
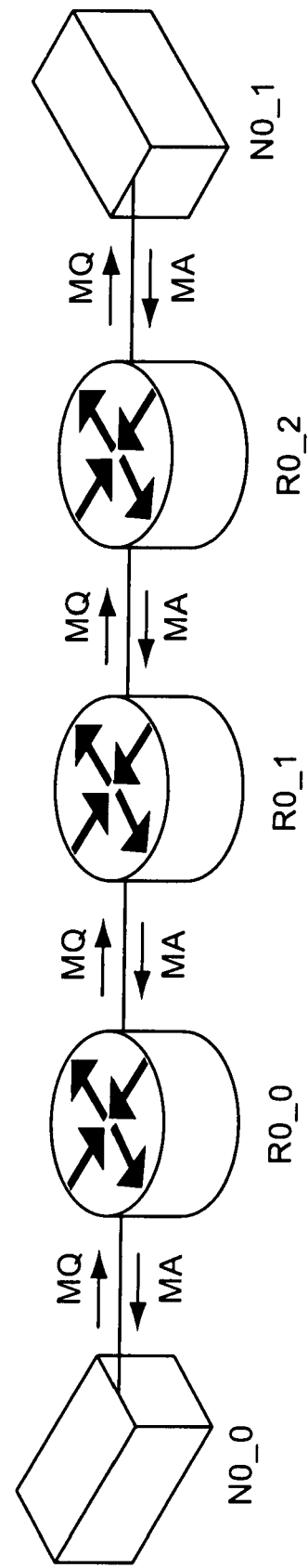
FIG. 7 shows an example use scenario for a distributed version of a protocol "A" in a cluster.

FIG. 7 shows an example use scenario for a distributed version of a protocol "A". In this example, a protocol is designed for a distributed case as shown in FIG. 7. In this FIG. 7, the node N0_0 using a protocol "A" sends a message MQ, which is routed to its destination node N0_1. When the node N0_1 receives the message MQ, it issues a message MA back to the node N0_0.

Now, the issue is to reuse the same protocol "A" in a centralized way, without changing at all its behavior or data packets which were defined for a distributed approach.

The idea is to have a possibility to re-route packets in a transparent way to protocols above L3, so that protocols above L3 do not have to understand the L3 addressing (e.g. it should not lead to packet reordering). The assumption is made that the L3 protocol supports a way to extend the L3 header and an L3 extension is used to mark a packet which has to be re-routed.

The L3 extension of the header contains the original L3 address of destination and source nodes, while the addresses in the L3 header are replaced by the address of the cluster manager for the destination, and by the address of the cluster router which intercepted the packet for the source.

The rules that a cluster router follows to route the data packet are as follows: a L3 data packet without the re-routing L3 extension header is simply routed without any extra processing. For the L3 data packet with the re-routing L3 extension the following transformations are made.

Copying the original destination and source address in the extension and replace the destination in the L3 header by the address of the cluster manager node. This can be made for all L3 data packets, but different behaviors could also be defined and have different cluster manager node for different purposes. An extra field in L3 re-routing extension can be used to recognize which cluster manager node to use or what category of service is transported, divided into the categories connection management, congestion control, load balancing, etc.

Replacing the source in the L3 header by the address of the cluster router that intercepted the data packet.

Marking the L3 data packet as being already intercepted by a cluster router using one bit field in the L3 header extension.

Following these rules, an L3 data packet, which has been intercepted by a cluster router, will be routed to the cluster manager node even by routers with no knowledge of the L3 re-routing extension.

With the re-routing extension there can be defined any protocol which works either in a centralized or distributed manner. Furthermore, each cluster for any protocol can have its own strategy with ensured interoperability across the whole network.

Figure 8:
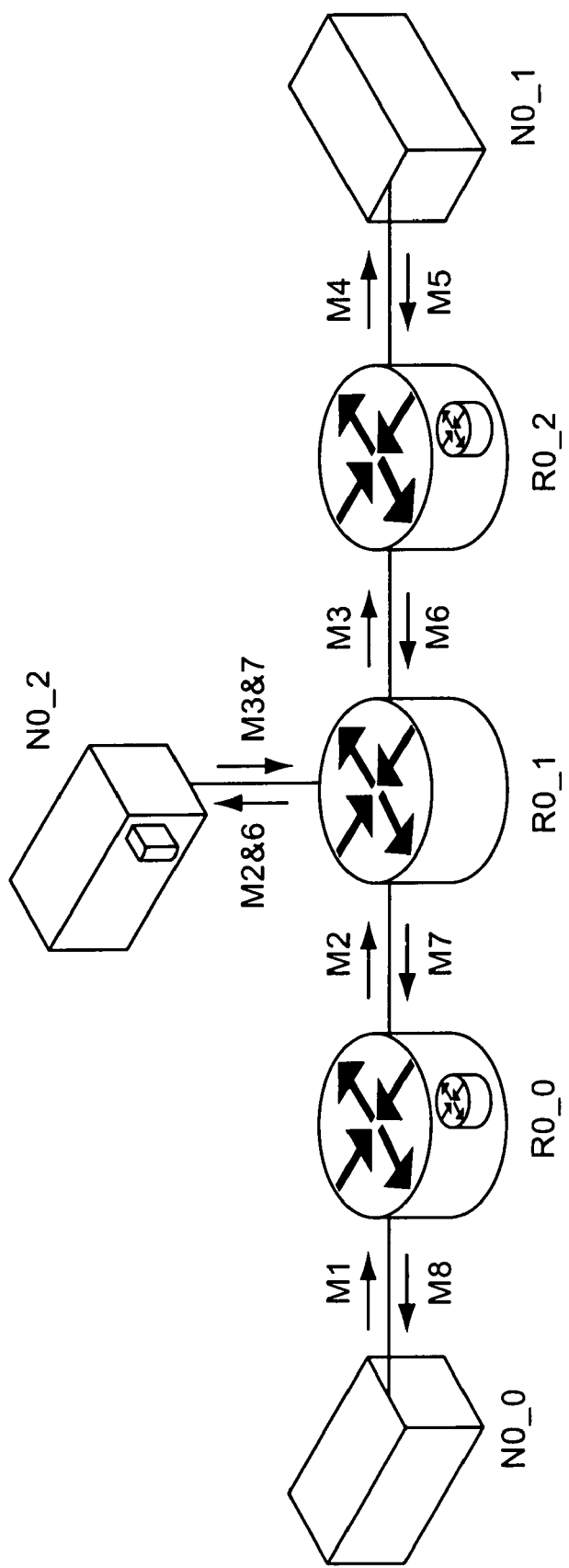
FIG. 8 shows an example use scenario for a centralized version of a protocol "A" in a cluster.

FIG. 8 shows another use scenario, where messages are created when protocol "A" is used in a centralized manner.

If the protocol "A" is used in a centralized way, a management entity in the node N0_0 will recognize or know that it is used in a centralized way and will add the re-routing L3 extension header to all L3 data packets carrying the protocol "A". This decision can be made at the design time or at boot time or could even be made dynamically for certain protocols.

First, node N0_0 will emit, as in the distributed case, a message MQ following the protocol "A". The management entity in N0_will force the addition of L3 re-routing extension header to the message MQ which then becomes message M1.

When the router R0_0 receives M1, it recognizes the L3 re-routing extension and applies the re-routing rules described earlier. It effectively re-routes the M1 towards the centralized manager node N0_2 by changing the destination and source address in the L3 header, but also marks M2 as being already intercepted by a Cluster Router, thereby creating a new message M2.

When the router R0_1 receives the message M2, it will route M2 as any other L3 data packet, since he does not know about the L3 re-routing extension header. Since the destination address in this data packet is now N0_2, M2 will be sent towards the centralized manager N0_2.

When the node N0_2 receives the message M2, it sees that the L3 re-routing header extension is present and has been marked as "already intercepted". The latest is very important because the node N0_2 can then make distinctions as described below.

Figure 9:
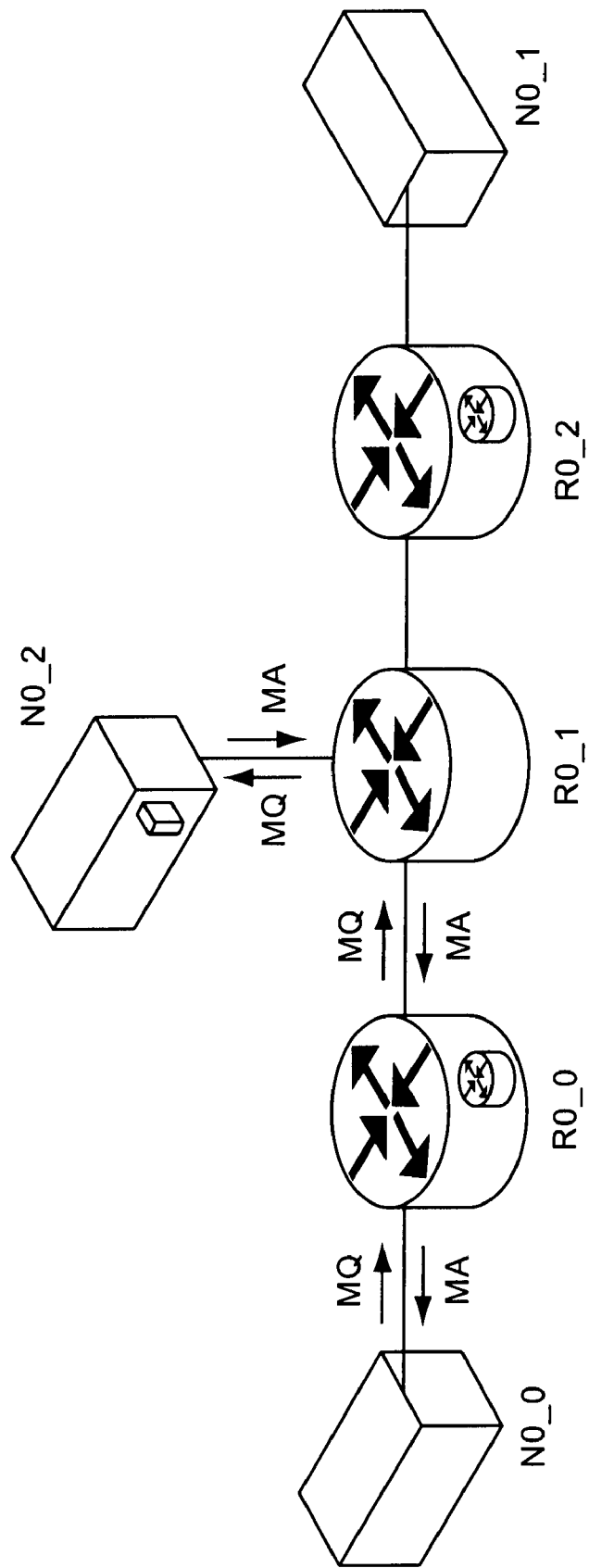
FIG. 9 shows an example use scenario with a message according to the distributed version of a protocol "A" targeted to the managing device.

A MQ message according to protocol "A" which was sent in a distributed way with destination node N0_2, because in this case there would be no L3 re-routing extension header, as it is shown in FIG. 9. The distributed implementation of protocol "A" will handle the message.

A MQ message according to protocol "A" which was sent in a centralized way towards any other node then itself, because the destination node address in the header extension would have an address different of N0_2. Then the centralized implementation of protocol "A" in N0_2 will receive and handle the message which will lead to the need of more work to reach the real destination N0_1, as it is illustrated in FIG. 8. The centralized manager implementation of protocol "A" will handle the message.

Figure 10:
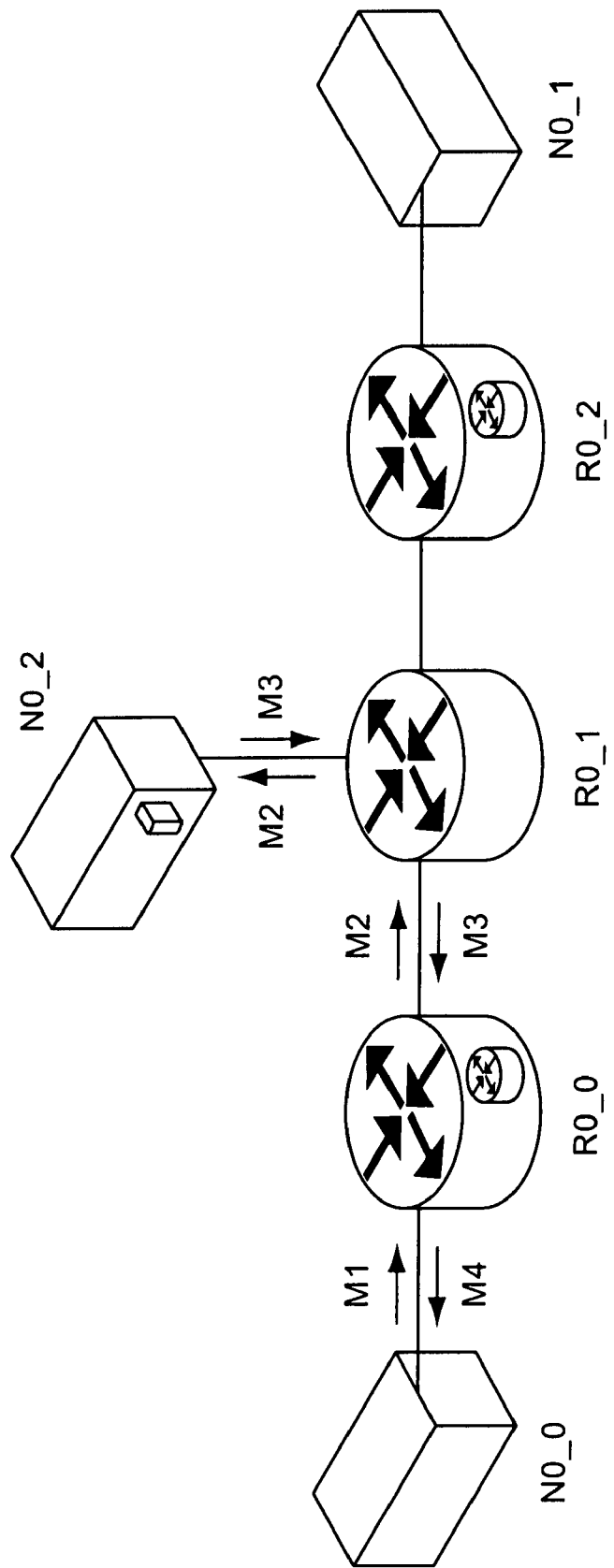
FIG. 10 shows an example use scenario with a message according to the centralized version of a protocol "A" targeted to the managing device.

A MQ message according to protocol "A" which was sent in a centralized way with destination node N0_2, because the destination address in the L3 re-routing extension header of M2 is N0_2, see FIG. 10. Here, there is no definitive rule saying if distributed or centralized implementation of protocol "A" would handle the message. This may be different per protocol.

Thus, when the M2 message is sent in a centralized way and the original destination is N0_1, i.e. not the cluster manager node itself, see scenario in FIG. 8, a message M3 is sent with node N0_1 as destination. M3 must be marked as "already intercepted". Otherwise it could be re-routed towards the cluster manager node in N0_2 again.

When router R0_2 receives M3, it recognizes that M3 was already intercepted and routes it normally. Additionally, R0_2 may remove then the L3 re-routing extension header. The decision to remove it or not can be per protocol, but most protocols simply do not need and are not able to handle this extension. Nonetheless, few very specific protocols may need or take advantage of the information stored in this extension header.

When the destination N0_1 receives M4, the receiving entity of protocol "A" will not see any difference compared to the message MQ which would have been sent by a distributed implementation of protocol "A".

Following protocol "A", the message MQ/M1 may need a reply. In such a case, a message MA/M5 is generated at the node N0_1, which will follow exactly the same pattern as the message M1 but in the backward direction.

The description above has shown that any node implementing a distributed version of the protocol "A" can operate in a network with a centralized version of protocol "A". Thus, it is shown that a distributed and centralized implementation of a protocol can coexists on the same cluster.

Figure 11:
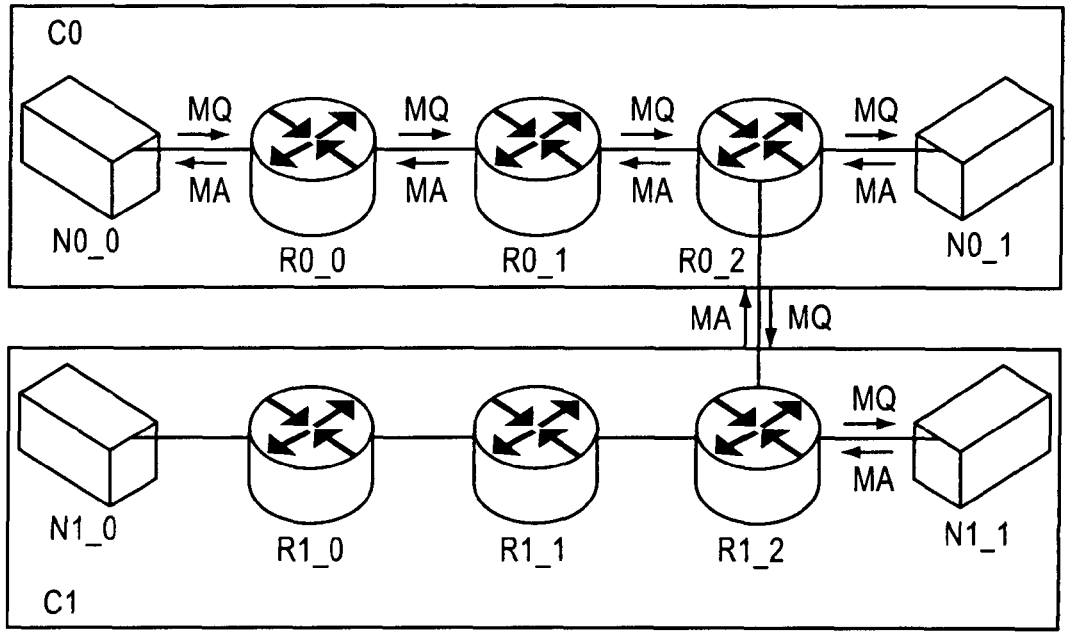
FIG. 11 shows a message exchange between two clusters with distributed management.

If a distributed implementation of protocol "A" is used in all clusters, the clustering is completely transparent and then has no impact. This case is illustrated in FIG. 11. From this, we can see that the cluster C0 or C1 behaves exactly like a node would in terms of what messages are issued and in terms of protocol behavior. Then it could be said that a cluster is also a cluster node. Basically FIG. 11 can be simplified by abstracting the structure of the cluster C0 and the resulting structure is shown in FIG. 12.

Figure 12:
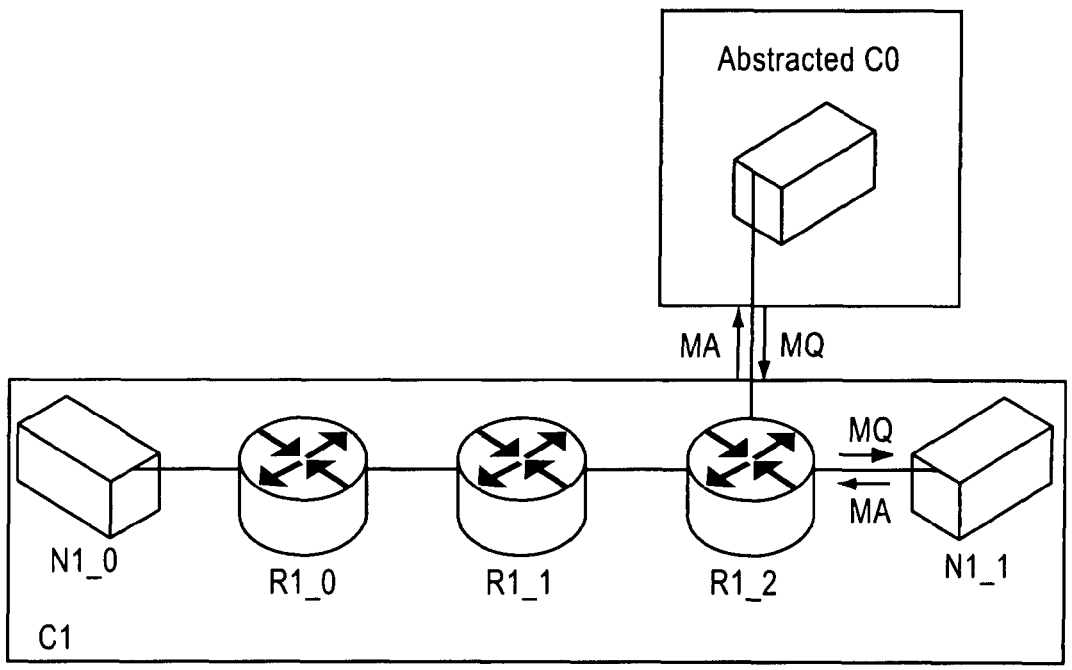
FIG. 12 shows a message exchange between two clusters with distributed management with one cluster being abstracted.

In FIG. 12 it can be seen that from a behavioral perspective that the system of two clusters is equivalent to one cluster where one node is an abstracted node replacing the behavior of the complete cluster C0. So all previous conclusions made for a cluster apply as well for two clusters and by recursion to any number of clusters.

Figure 13:
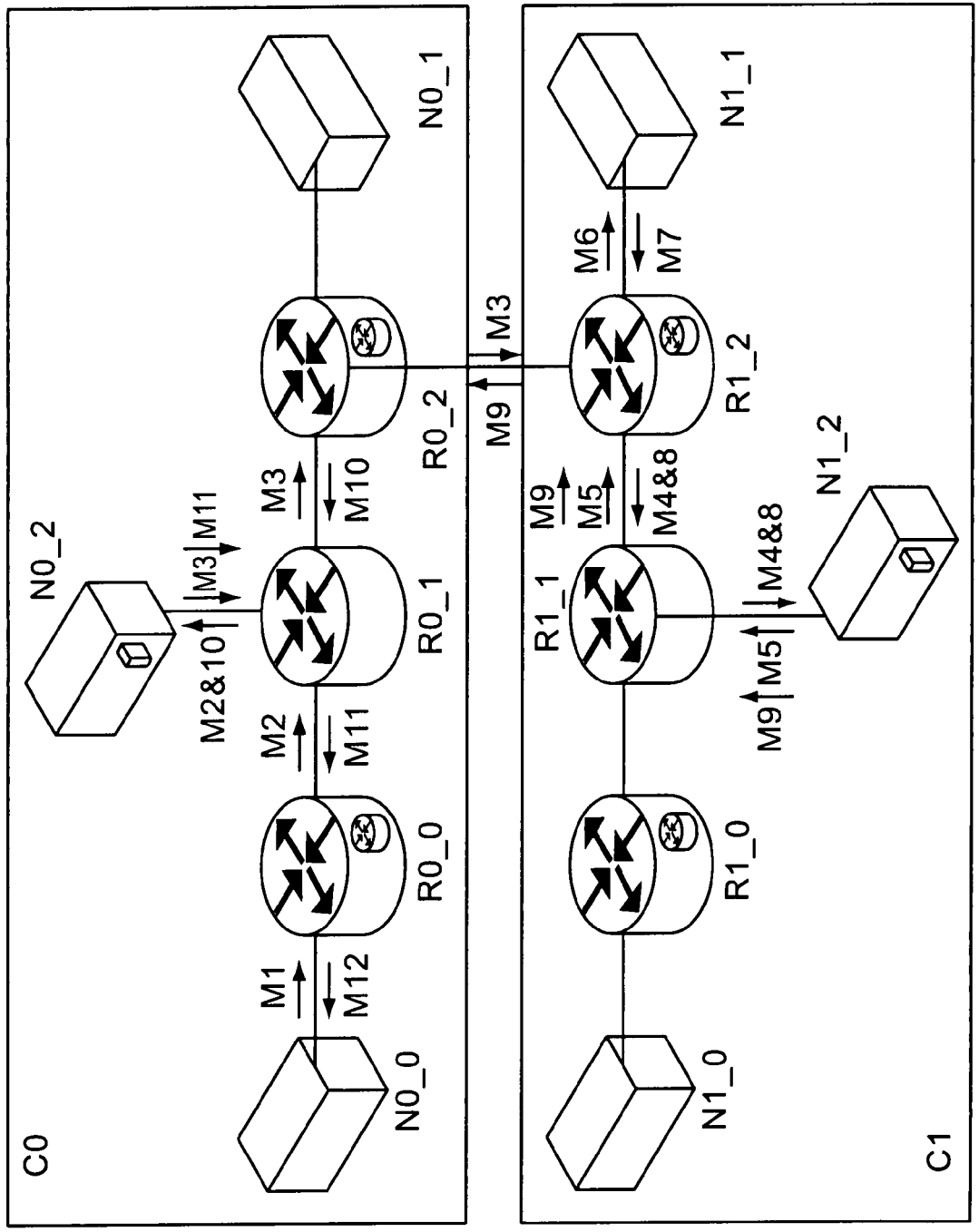
FIG. 13 shows a message exchange between two clusters with centralized management.

FIG. 13 illustrates all the messages flowing between two clusters, when the node N0_0 from cluster C0 sends a message of a protocol "A" to a node N1_1 from cluster C1. According to FIG. 13, source N0_0 issues a data packet M1 having the extended header with node N1_1 as destination. When router R0_0 intercepts the data packet, it replaces the destination and source START address in the L3 header by the address of N0_2 and the address of itself, copies the original destination and source addresses into the extended header, marks the data packet as being already intercepted, and forwards the processed data packet M2 to the cluster manager node N0_2.

The cluster manager node N0_2 recognizes that the data packet is to be routed according to a centralized version of a protocol and that the address of the destination contained in the extended header is not the address of itself. Thus, the cluster manager node replaces the address of the destination in the header by the address of the original destination contained in the extended header and forwards data packet M3 having the address of node N1_1 as a destination. Here, in FIG. 13, it is assumed that the cluster manager N0_2 knows that destination N1_1 is in a different cluster than the source N0_0. When cluster router R0_2 receives the data packet, it recognizes that the data packet has already been intercepted and forwards the data packet M3 without any processing. However, similar address translation could occur at the border of the cluster (R0_2 in FIG. 13).

When receiving the data packet M3, the cluster router R1_2 replaces the destination and source address in the L3 header by the address of the cluster manager node N1_2 and the address of itself and copies the original destination and source addresses into the extended header and then forwards the processed data packet M4 to the cluster manager node N1_2.

In a similar manner than the cluster manager node N0_2 in the foregoing, now the cluster manager node N1_2 recognizes that the data packet is to be routed according to a centralized version of the protocol and that the address of the destination contained in the extended header is not the address of itself. Thus, the cluster manager node replaces the address of the destination in the header by the address of the original destination contained in the extended header and forwards a data packet M5 having the address of node N1_1 as a destination. When cluster router R1_2 receives the data packet, it recognizes that the data packet has already been intercepted. Then, the cluster router R1_2 may remove the extended header and forward a data packet M6 without the extended header to the destination N1_1.

In case, the message M1 needs a reply, a message M7 is generated at the node N1_1, which will follow exactly the same pattern as the message M1 but in the backward direction.

In the following, an example of a clustered connection management protocol will be described with reference to FIG. 14.

One possible reason to use a centralized connection management protocol is to concentrate the intelligence in one node (i.e. the cluster manager node), which leads to reducing the overall cost. In this case, likely the node acting as server during the connection establishment does not even have an implementation of the connection management protocol. The cluster manager node may use a configuration protocol or any other proprietary scheme to setup remotely the destination node.

Figure 14:
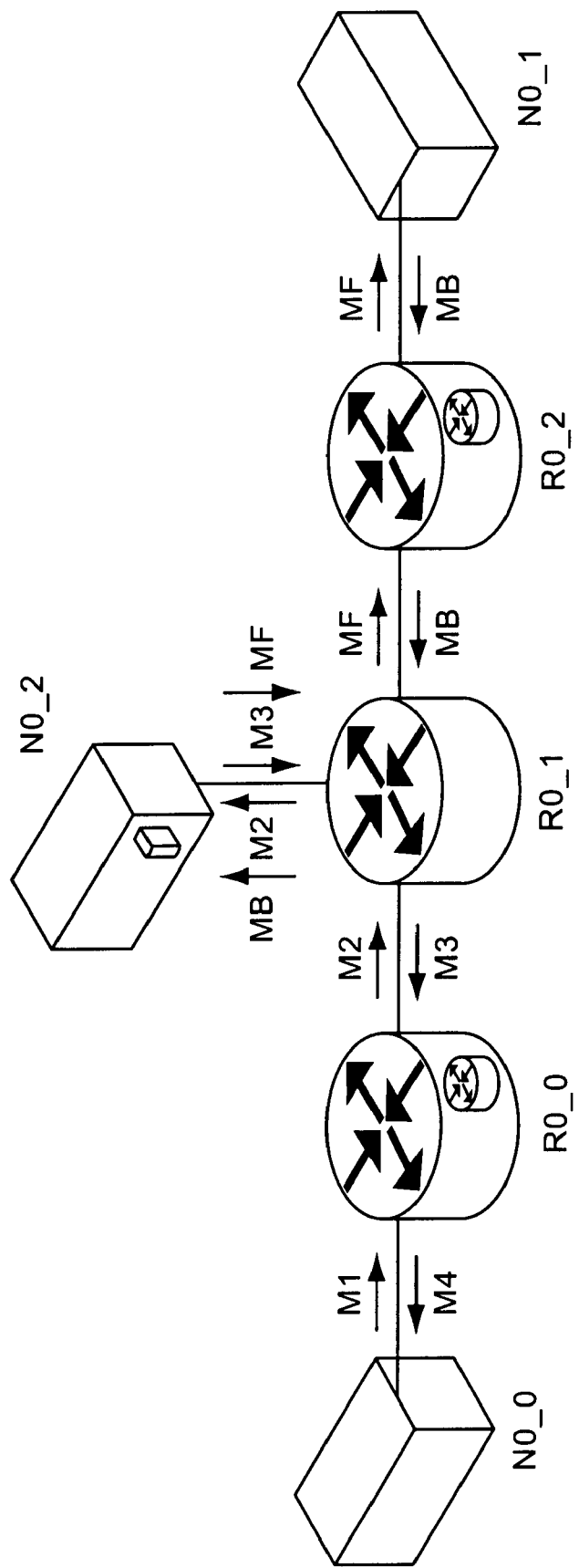
FIG. 14 shows a message exchange wherein the destination does not implement a connection management protocol.

In FIG. 14, node N0_1 does not implement the connection management protocol and protocol "A", which uses messages MF and MB is used to setup node N0_1. On the other hand, node N0_0 uses the connection management protocol. Of course in this case, the only way to setup a connection towards N0_1 is to use a centralized connection management protocol as shown in FIG. 14.

According to FIG. 14, source N0_0 issues a data packet M1, which is routed via the cluster router R0_0 and the router R0_1 to the cluster manager node N0_2 in the same way as described above. The cluster manager node N0_2 recognizes that the destination N0_1 does not implement the connection management protocol and therefore processes the received data packet M2. The cluster manager node replaces the address of the destination in the header by the address of the original destination contained in the extended header. Thereby, the cluster manager node produces a data packet MF that is forwarded using the distributed mode of operation to the destination N0_1.

In case, the message MF needs a reply, a message MB is generated at the node N0_1, which will be processed in a similar way, but in the backward direction.

Further, it can be concluded that a cluster may use a proprietary way to setup connections within the cluster and use the connection management protocol for all incoming or outgoing connections outside the cluster. Nonetheless, even if within the cluster connections are setup with a proprietary protocol, data exchanges when the connection is established could still use the same protocol in all clusters in a network.

It can be seen from FIG. 13 that the whole procedure may not be very efficient in terms of number of messages and hops a message has to go through. To improve the situation it is suggested adding some features to the re-routing extension. The improvement allows to actually merge advantages of centralized and distributed systems, which requires that all routers in the network must recognize the L3 re-routing extension.

In FIG. 13 we see that the message M2 has to go through N0_2 before the information is forwarded further with message M3. To reduce this delay, there may be added a copy flag in the L3 re-routing extension header by the switch/router at the intersection of the shortest paths to the destination and the cluster manager node. If a router receives a L3 data packet with the L3 re-routing extension header, the router checks (e.g. in case of the cluster router by means of the checking unit 59 shown in FIG. 5) if the output ports of the destination addresses from the L3 header and from the L3 re-routing extension header are the same. If the addresses are not the same, the data packet is copied, the original data packet continues towards the destination and the copied data packet is sent towards the cluster manager node with a copy flag set to indicate that this data packet is a copy. If the addresses are the same, the data packet is sent to the output ports leading towards the destination.

The most relevant implementation of the clustering scheme according to the present invention is its deployment within scope of MIPI/UniPRO (Mobile Industry Processor Interface alliance/Unified Protocol) standard proposal. Here we use a feature of the UniPRO PDU (protocol data unit) that provides a mechanism to extend the network layer (L3) header, so that the described extension is perfectly implementable in UniPRO.

The current mechanism to extend the L3 header gives the possibility to extend the header by an integer number of symbols, where the symbol size is 16 bits. Among those 16 bits, one is reserved for the extension mechanism itself and other 15 bits are for the extension information, as it can be seen in FIG. 15. In the current PDU format description, there can be distinguished between the following fields: The fields which will be part of the first UniPRO specification, including: L3s, Destination DeviceID (destination device identification), Source DeviceID (source device identification), all Ext bits (extension bits), Ver bit (verification bit) and all the Rsv bits (reserved resources bits). The fields which will be defined in a later release of UniPRO specification, including the fields: Ext Header ID (extension header identification) and ExtH Size (extension header size). And the fields which represent the actual format of an extension, including fields Parameter, Parameter0, Parameter1 and Parameter2.

The format of the proposed re-routing extension is shown in FIG. 16. According to FIG. 16, if a RR bit (record route bit) is set to 1, the original Destination and Source DeviceID fields are present in the second symbol of the extension. If a Copy bit is set to 1, it means this PDU has been copied and is not the original PDU. Otherwise, the PDU has the original PDU format. The original DeviceIDs are the addresses which where in the PDU before it was intercepted by the cluster Router.

The present invention allows to overcome the network components compatibility problem, reduces network management overhead and improves network scalability. As a consequence it makes device integrators less dependent from the components providers, as it allows to easily replace any component or group of components by the product of other suppliers, which also improves fairness of competition between component providers. The present invention is built using the standard extension mechanism provided in UniPRO, which makes its deployment and use very simple. It also simplifies the problem of connecting new modules to UniPRO network, e.g. for the hot plug-in scenario.

In view of the foregoing description it will be evident to a person skilled in the art that various modifications may be made within the scope of the invention.

All processing steps that have been described in the foregoing can also be implemented using computer-readable signals that may be stored on a computer-readable medium and carry instructions to be executed by one of the devices.

What is claimed:
1. A method, comprising:
analyzing, at a managing device, whether a received data packet is to be routed according to a first version or a second version of a protocol;
when the data packet is a data packet to be routed according to the second version of a protocol and a destination address in an extended header of the data packet to be routed according to the second version of the protocol is not the address of the managing device itself,
replacing a destination address in a header by an address of a destination contained in the extended header, and forwarding the data packet; and
when a copy flag in an extended header has a predetermined value and when the addresses of the destination in the header and the extended header are the same, receiving a copy of the data packet at the managing device,
wherein the data packet is forwarded to the address of the destination.
2. The method of claim 1, further comprising:
receiving the received data packet from a device that intercepted the data packet, wherein the device in a same cluster as the managing device.
3. The method of claim 1, wherein the data packet to be routed according to the second version of the protocol comprises an extended header.
4. The method of claim 1, wherein the data packet to be routed according to the second version of the protocol comprises a marker indicating whether the predetermined rules have been applied.

5. The method of claim 1, further comprising:
when the data packet is recognized to be routed according to the first version of the protocol, receiving the data packet substantially unmodified.

6. The method of claim 1, further comprising:
when the data packet is recognized to be routed according to the second version of the protocol and is marked as having been intercepted, receiving the data packet substantially unmodified.

7. The method of claim 1, wherein
when the data packet is recognized to be routed according to the second version of the protocol and is marked as having been intercepted, receiving the data packet without the extended header.

8. An apparatus, comprising:
a processor;
a memory including computer program code,
the memory and the computer program code configured to, with the processor, cause the apparatus at least to,
analyze whether a data packet is to be routed according to a first version or a second version of a protocol,
determine whether an address of a destination in a header and an address of an original destination contained in an extended header are the same,
replace the address of the destination in the header by the address of the original destination contained in the extended header,
forward the data packet, and
when a copy flag in an extended header has a predetermined value and when the addresses of the destination in the header and the extended header are the same, receive a copy of the data packet at the apparatus,
wherein the data packet is forwarded to the address of the destination.

9. The apparatus of claim 8, wherein the apparatus comprises a semiconductor chip.

10. A method, comprising:
creating, at a communication device, an extended header of a data packet to be routed in a communication network, wherein the creating comprising:
adding an extension header identification field,
adding an extension header size field,
adding an original source identification field and an original destination identification field, and
adding a record route field indicating whether the original source identification field and the original destination identification field are present,
wherein, when a copy flag in the extended header has a predetermined value and when addresses of a destination in a header of the data packet and the extended header are the same, a copy of the data packet is received at a managing device, and
wherein the data packet is forwarded to the address of the destination.

11. The method of claim 10, wherein the creating further comprises adding a copy field indicating whether the data packet is an original or a copy.

12. An apparatus, comprising:
a processor;
a memory including computer program code,
the memory and the computer program code configured to, with the processor, cause the apparatus at least to,
create an extended header of a data packet to be routed in a communication network,
add an extension header identification field,
add an extension header size field,
add an original source identification field and an original destination identification field, and
add a record route field indicating whether the original source identification field and the original destination identification field are present,
wherein, when a copy flag in the extended header has a predetermined value and when addresses of a destination in a header of the data packet and the extended header are the same, a copy of the data packet is received at a managing device, and
wherein the data packet is forwarded to the address of the destination.

13. The apparatus of claim 12, wherein the memory and the computer program code are further configured to, with the processor, cause the apparatus to add a copy field.

14. The apparatus of claim 12 wherein the apparatus comprises a semiconductor chip.

15. A non-transitory computer readable medium having computer executable components comprising:
analyzing, at a managing device, whether a received data packet is to be routed according to a first version or a second version of a protocol;
when the data packet is a data packet to be routed according to the second version of a protocol and a destination address in an extended header of the data packet to be routed according to the second version of the protocol is not the address of the managing device itself,
replacing a destination address in a header by an address of a destination contained in the extended header, and
forwarding the data packet; and
when a copy flag in an extended header has a predetermined value and when the addresses of the destination in the header and the extended header are the same, receiving a copy of the data packet at the managing device,
wherein the data packet is forwarded to the address of the destination.

16. A non-transitory computer readable medium having computer executable components comprising:
creating an extended header of a data packet to be routed in a communication network, wherein the creating comprising:
adding an extension header identification field,
adding an extension header size field,
adding an original source identification field and an original destination identification field, and
adding a record route field indicating whether the original source identification field and the original destination identification field are present,
wherein, when a copy flag in the extended header has a predetermined value and when addresses of a destination in a header of the data packet and the extended header are the same, a copy of the data packet is received at a managing device, and
wherein the data packet is forwarded to the address of the destination.

* * * * *